US011552925B1

United States Patent
Craciun et al.

(10) Patent No.: US 11,552,925 B1
(45) Date of Patent: Jan. 10, 2023

(54) SYSTEMS AND METHODS OF CONTROLLING INTERNET ACCESS USING ENCRYPTED DNS

(71) Applicant: Bitdefender IPR Management Ltd., Nicosia (CY)

(72) Inventors: Ovidiu M. Craciun, Buchare (RO); Adrian Budau, Bacau (RO); Paul D. Boca, Cluj-Napoca (RO); Constantin D. Cernat, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 17/644,167

(22) Filed: Dec. 14, 2021

(51) Int. Cl.
H04L 61/4511 (2022.01)
H04L 9/40 (2022.01)
H04L 69/22 (2022.01)

(52) U.S. Cl.
CPC ...... *H04L 61/4511* (2022.05); *H04L 63/0428* (2013.01); *H04L 63/123* (2013.01); *H04L 69/22* (2013.01); *H04L 63/166* (2013.01)

(58) Field of Classification Search
CPC ............. H04L 61/4511; H04L 63/0428; H04L 63/123; H04L 69/22; H04L 63/166
See application file for complete search history.

(56) References Cited

U.S. PATENT DOCUMENTS

| | | | |
|---|---|---|---|
| 7,792,994 B1 | 9/2010 | Hernacki | |
| 9,419,942 B1 | 8/2016 | Buruganahalli | |
| 9,648,021 B2 | 5/2017 | Tsai | |
| 10,505,970 B2* | 12/2019 | McGrew | H04L 63/1441 |
| 10,924,456 B1* | 2/2021 | Moore | H04L 63/205 |
| 2015/0180892 A1 | 6/2015 | Balderas | |
| 2016/0241508 A1 | 8/2016 | Seo | |
| 2018/0351974 A1 | 12/2018 | Baughman | |
| 2019/0356694 A1* | 11/2019 | Wang | H04L 63/0281 |
| 2020/0213266 A1 | 7/2020 | Sichevoy | |
| 2020/0213277 A1 | 7/2020 | Rudnick | |
| 2021/0029074 A1 | 1/2021 | Buck | |
| 2021/0092595 A1 | 3/2021 | Ramachandran | |
| 2021/0112040 A1 | 4/2021 | Niemi | |
| 2021/0243170 A1 | 8/2021 | Puente | |
| 2021/0250349 A1 | 8/2021 | Konda | |
| 2021/0266185 A1 | 8/2021 | Konda | |

* cited by examiner

*Primary Examiner* — Cheikh T Ndiaye
(74) *Attorney, Agent, or Firm* — Law Office of Andrei D Popovici, PC

(57) ABSTRACT

Described systems and methods enable protecting client devices (e.g., personal computers and IoT devices) implementing encrypted DNS protocols against harmful or inappropriate Internet content. A DNS proxy intercepts an attempt to establish an encrypted communication session between a client device and a DNS server. Without decrypting any communications, some embodiments of the DNS proxy determine an identifier of the respective session and an identifier of the client device, and send a query tracer connecting the session identifier with the client identifier to a security server. In some embodiments, the security server obtains the domain name included in an encrypted DNS query from the DNS server and instructs the DNS server to allow or block access of the client device to the respective Internet domain according to a device- and/or user-specific access policy.

17 Claims, 13 Drawing Sheets

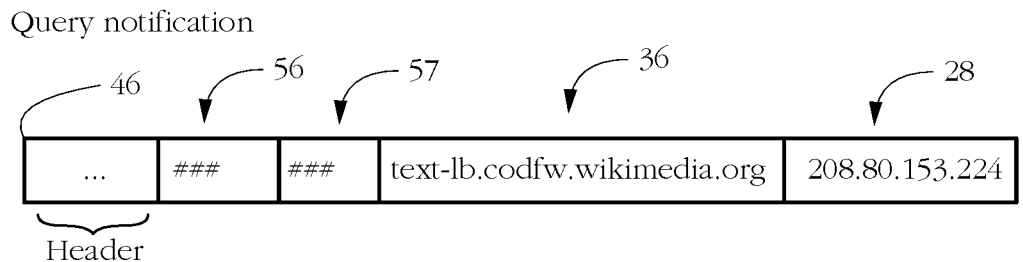
FIG. 13
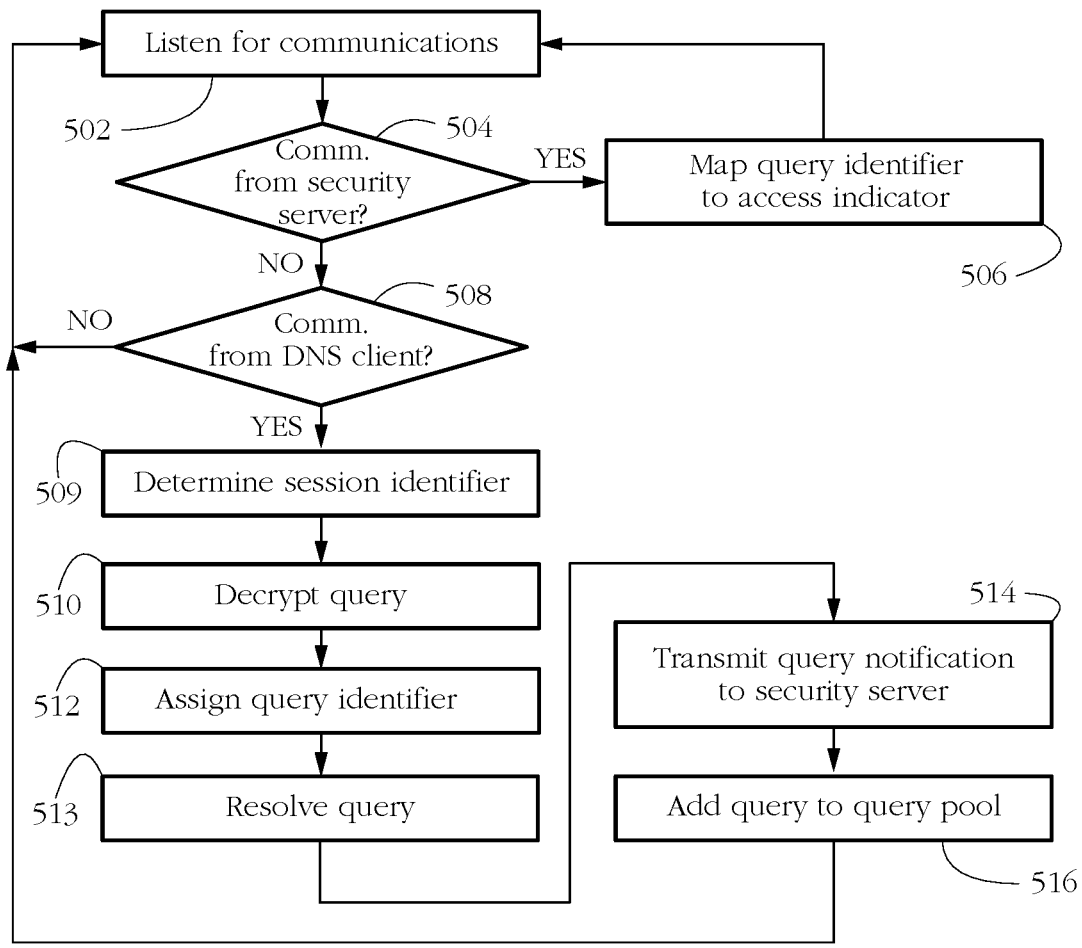
FIG. 14-A

FIG. 14-B

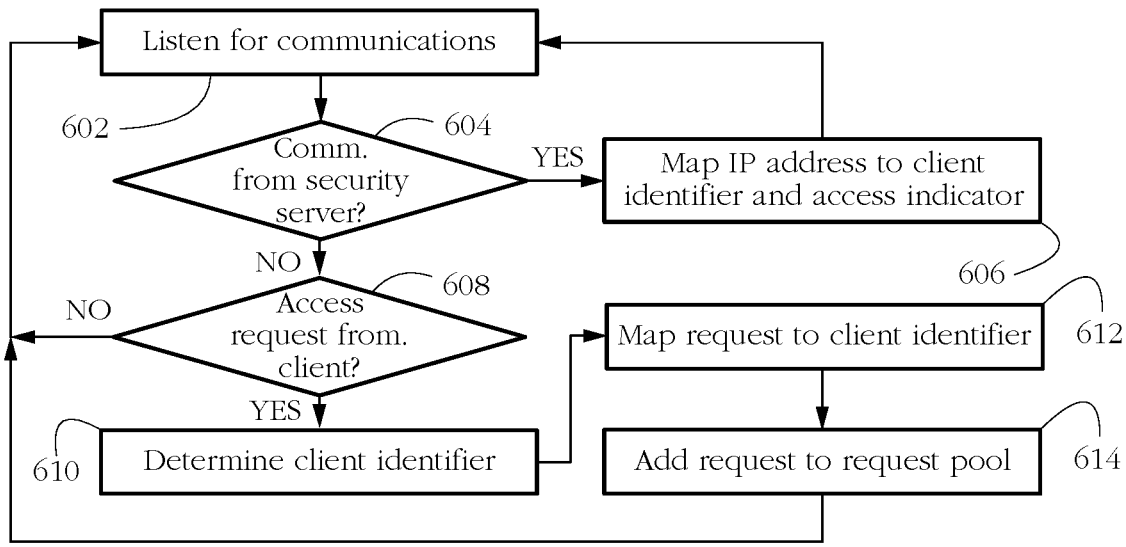
FIG. 17-A
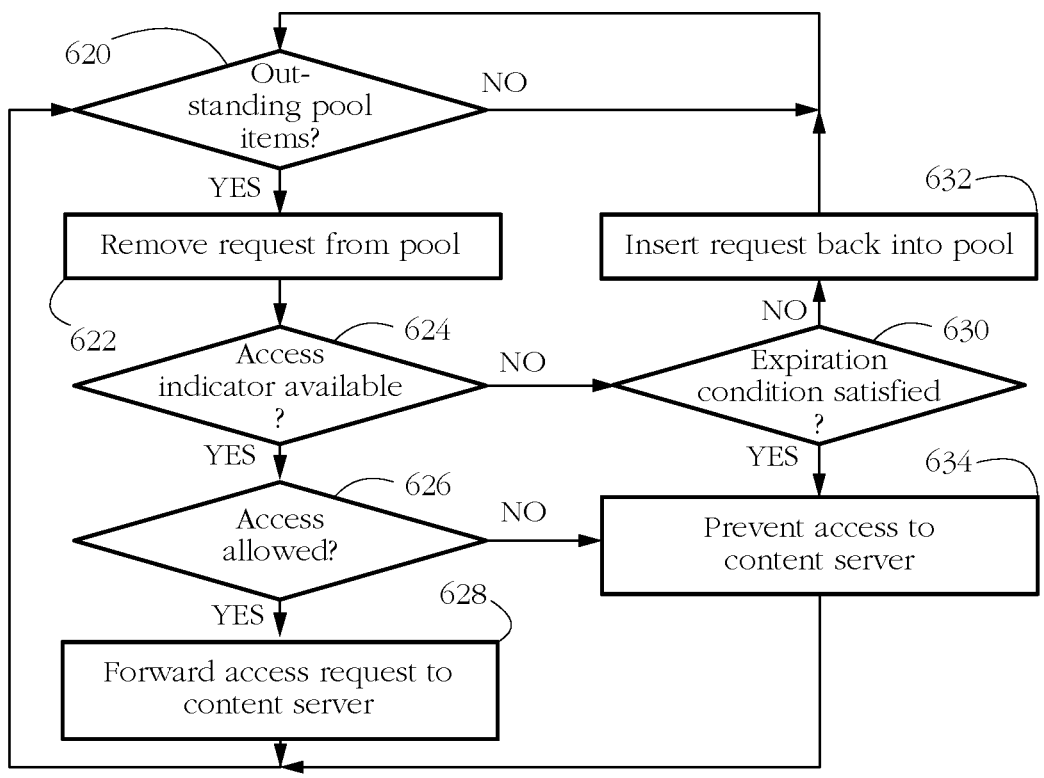
FIG. 17-B

SYSTEMS AND METHODS OF CONTROLLING INTERNET ACCESS USING ENCRYPTED DNS

BACKGROUND

The invention relates to computer security, and in particular to protecting users from malicious Internet content.

Malicious software, also known as malware, affects a great number of computer systems worldwide. In its many forms such as computer viruses, Trojan horses, spyware, and ransomware, malware presents a serious risk to millions of computer users, making them vulnerable to loss of data and sensitive information, to identity theft, and to loss of productivity, among others. An important avenue for malware proliferation consists of users inadvertently accessing websites hosting malicious or fraudulent content.

Meanwhile, an increasing number of devices informally referred to as the Internet of Things (IoT) are being connected to communication networks and the Internet. Such devices include, among others, smartphones, smartwatches, TVs and other multimedia devices, game consoles, home appliances, and various home sensors such as thermostats. As more such devices go online, they become exposed to security threats like malware and intrusion. Therefore, there is an increasing need of securing such devices against malware, as well as of protecting communications to and from such devices. A particular area wherein interest has been renewed by the advent of the Internet of Things includes access control applications, for instance parental control and preventing confidential information from being transmitted via IoT devices.

Conventional methods of protecting users and devices include intercepting a domain name service (DNS) message sent by a protected device during an attempt to connect to a remote Internet resource. In one such example, a modified DNS server may look up the requested domain in a blacklist. When the domain is considered unsafe, the DNS server may block access and/or redirect the respective request to a replacement IP address serving a warning message. In another example, such DNS-based traffic filtering is performed by hardware and/or software components executing on a user's network appliance (e.g., gateway or router).

Concerns for user privacy have led to the development of encrypted domain name services. Examples include DNS over transport layer security (TLS), as described for instance in request for comments (RFC) 7858 of the Internet Engineering Task Force (IETF), and DNS over hypertext transport protocol secure (HTTPS), as described for instance in IETF RFC 8484. Since such protocols implement end-to-end encryption, they may substantially hinder computer security activities by preventing an intermediary (e.g., router) from carrying out DNS-based traffic filtering.

There is therefore considerable interest in developing computer security systems and methods enabling traffic filtering in the case of encrypted DNS.

SUMMARY

According to one aspect, a method comprises employing at least one hardware processor of a network appliance to execute a DNS proxy. The DNS proxy is configured to intercept an attempt to establish an encrypted communication session between a client device and a DNS server, wherein the client device is connected to the network appliance over a local network, and wherein the encrypted communication session comprises a cleartext part and an encrypted part. The encrypted part includes transmitting an encrypted DNS query to the DNS server. The DNS proxy is further configured to determine a session identifier identifying the encrypted communication session and a client identifier identifying the client device, the session identifier determined according to a content of the cleartext part of the encrypted communication session. The DNS proxy is further configured to transmit a query tracer associating the session identifier with the client identifier to a security server configured to determine an access indicator according to the query tracer, the access indicator indicating whether an access policy selected according to the client identifier allows accessing an Internet domain identified according to the encrypted DNS query. The security server is further configured to communicate the access indicator for enforcing the access policy.

According to another aspect, a network appliance comprises at least one hardware processor configured to execute a DNS proxy. The DNS proxy is configured to intercept an attempt to establish an encrypted communication session between a client device and a DNS server, wherein the client device is connected to the network appliance over a local network, and wherein the encrypted communication session comprises a cleartext part and an encrypted part. The encrypted part includes transmitting an encrypted DNS query to the DNS server. The DNS proxy is further configured to determine a session identifier identifying the encrypted communication session and a client identifier identifying the client device, the session identifier determined according to a content of the cleartext part of the encrypted communication session. The DNS proxy is further configured to transmit a query tracer associating the session identifier with the client identifier to a security server configured to determine an access indicator according to the query tracer, the access indicator indicating whether an access policy selected according to the client identifier allows accessing an Internet domain identified according to the encrypted DNS query. The security server is further configured to communicate the access indicator for enforcing the access policy.

According to another aspect, a non-transitory computer-readable medium stores instructions which, when executed by at least one hardware processor of a network appliance, cause the network appliance to form a DNS proxy. The DNS proxy is configured to intercept an attempt to establish an encrypted communication session between a client device and a DNS server, wherein the client device is connected to the network appliance over a local network, and wherein the encrypted communication session comprises a cleartext part and an encrypted part. The encrypted part includes transmitting an encrypted DNS query to the DNS server. The DNS proxy is further configured to determine a session identifier identifying the encrypted communication session and a client identifier identifying the client device, the session identifier determined according to a content of the cleartext part of the encrypted communication session.

The DNS proxy is further configured to transmit a query tracer associating the session identifier with the client identifier to a security server configured to determine an access indicator according to the query tracer, the access indicator indicating whether an access policy selected according to the client identifier allows accessing an Internet domain identified according to the encrypted DNS query. The security server is further configured to communicate the access indicator for enforcing the access policy.

According to another aspect, a computer system comprises at least one hardware processor configured to receive from a DNS proxy a query tracer characterizing an encrypted communication session between a client device and a DNS server. The DNS proxy is connected to the client device over a local network, and the encrypted communication session comprises a cleartext part and an encrypted part, wherein the encrypted part comprises the client device transmitting an encrypted DNS query to the DNS server. The query tracer associates a session identifier with a client identifier, wherein the client identifier identifies the client device, and wherein the session identifier identifies the encrypted communication session and is determined according to a content of the cleartext part. The at least one hardware processor is further configured to receive from the DNS server a query notification comprising a domain name included in the encrypted DNS query, the query notification further associating the domain name with the session identifier. The at least one hardware processor is further configured to determine an access indicator according to the query tracer and query notification, the access indicator indicating whether an access policy selected according to the client identifier allows the client device to access an Internet domain having the domain name. The at least one hardware processor is further configured to communicate the access indicator for enforcing the access policy.

BRIEF DESCRIPTION OF THE DRAWINGS

The foregoing aspects and advantages of the present invention will become better understood upon reading the following detailed description and upon reference to the drawings where:

FIG. 13 shows exemplary components of a query notification according to some embodiments of the present invention.

FIG. 14-B shows another exemplary sequence of steps carried out by the DNS server according to some embodiments of the present invention.

FIG. 17-A shows an exemplary sequence of steps performed by the traffic filter according to some embodiments of the present invention.

FIG. 17-B shows another exemplary sequence of steps carried out by the traffic filter according to some embodiments of the present invention.

DETAILED DESCRIPTION OF PREFERRED EMBODIMENTS

Figure 1:
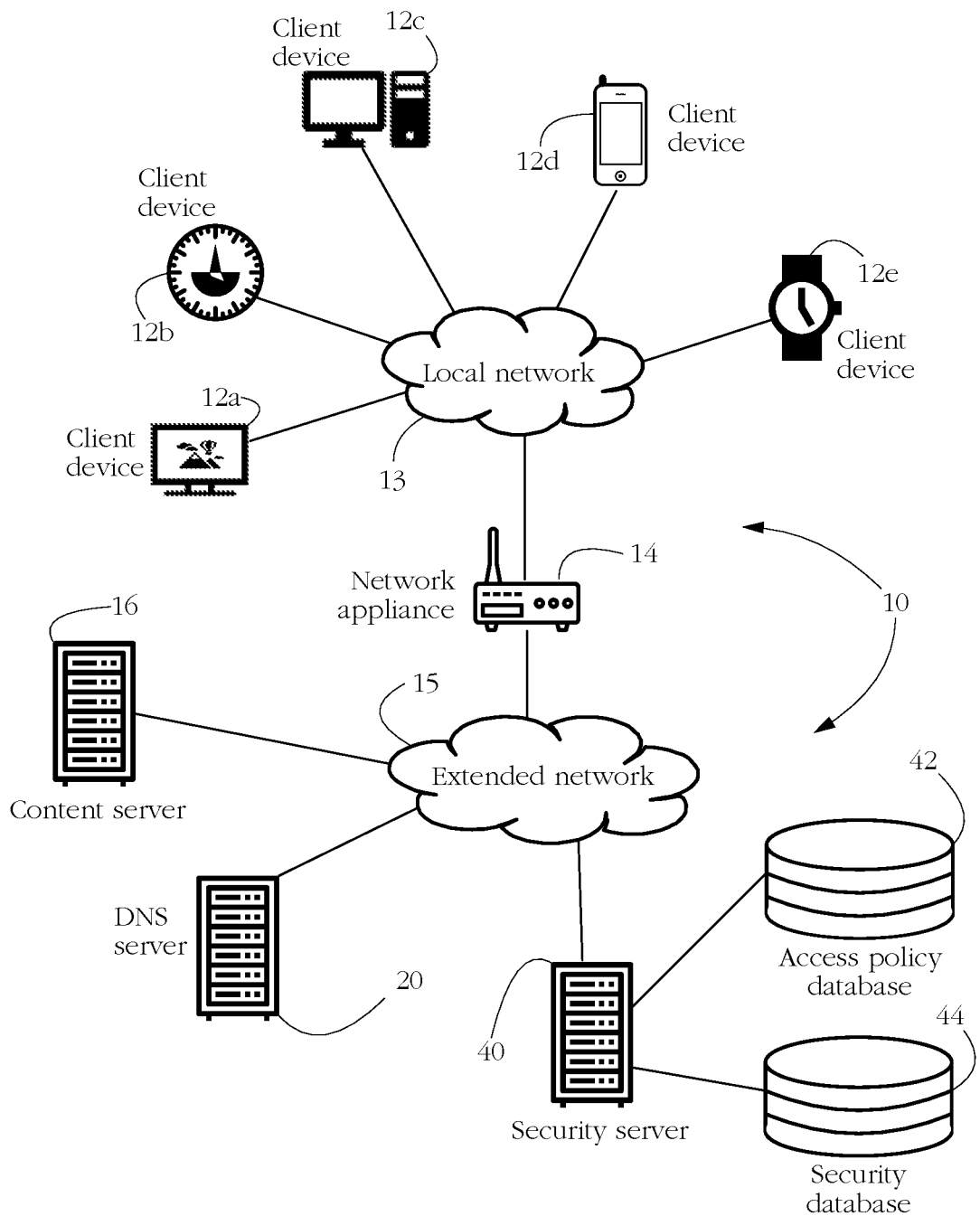
FIG. 1 shows an exemplary set of client devices protected against computer security threats according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A network domain consists of a group of interconnected computing devices forming a distinct part of a computer network. An Internet domain is a network domain connected to the public Internet. A domain name is a label/alias identifying an address of a network/Internet domain. Resolving a domain name herein denotes determining a network address of a domain having the respective domain name. Metadata herein denote features of a transmission other than the payload itself. Exemplary metadata includes, among others, network addresses of the sender and/or receiver, a size of the payload, and a timestamp indicating a real time of the respective transmission. Two devices are said to be connected to or to belong to the same local network when their network addresses belong to the same subnet and/or when both have the same broadcast address. A wide area network includes at least one router. The term 'database' is used herein to denote any organized collection of data. A hash is the output of a hash function. A hash function is a mathematical function mapping arbitrary length inputs into fixed-length outputs. A session identifier as described herein may include but is not limited to a content of a SessionID field of a ClientHello record. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 shows a system 10 for protecting a set of client devices 12a-e against computer security threats according to some embodiments of the present invention. Exemplary client devices 12a-e include personal computer systems, corporate mainframe computers, mobile computing platforms (e.g., laptop computers, tablets, mobile telephones), entertainment devices (e.g., TVs, game consoles), wearable devices (e.g., smartwatches, fitness bands), household appliances (e.g., refrigerators, washing machines), and any other electronic device comprising a processor, a memory, and a communication interface enabling the respective device to communicate with other devices/computer systems. Any exemplary client device 12a-e may interact with a remote content server 16 over a communication link, to exchange data such as web content, electronic messages, various documents, etc.

In the exemplary configuration of FIG. 1, client devices 12a-e are interconnected by a local network 13, such as a local area network (LAN), home network, corporate network, etc. Devices 12a-e may further be connected to an extended network 15, such as a wide area network (WAN) and/or the Internet. In some embodiments, at least a part of network traffic between client devices 12a-e and extended network 15 traverses a network appliance 14 such as a router, WiFi hotspot, network hub, etc. In the illustrated configuration, appliance 14 acts as a gateway device between local network 13 and extended network 15. In some embodiments, network appliance 14 executes various computer security operations, such as a firewall, scanning communications for malware, etc.

In some embodiments, a domain name service (DNS) server 20 collaborates with a security server 40 to protect client devices 12a-e as shown in detail below. Each of servers 20 and 40 generically represents a set of communicatively-coupled computers, which may or may not be in physical proximity to each other. A skilled artisan will know that actions performed by servers 20 and 40 as described herein may be divided among multiple physical machines or processors. In some embodiments, security server 40 may be embodied as a set of software modules executing on network appliance 14. In yet another exemplary embodiment, security server 40 and DNS server may be embodied as separate software modules executing on the same physical machine.

In some embodiments, security server 40 is further connected to a client policy database 42 and a security database 44, and configured to access database(s) 42 and/or 44 to carry out selective data insertion, data retrieval, and/or other database management operations. Policy database 42 is configured to store a plurality of client records related to client devices 12a-e and/or to the users of the respective client devices. In one example, each client record corresponds to a distinct client device 12a-e. A client record may store a set of identifiers of the respective client device (e.g. a client identifier as described below, a media access control—MAC address, an International Mobile Equipment Identity—IMEI number, a local network address, etc.), and an indicator of an Internet access policy specific to the respective client device. An access policy encodes a set of rules or restrictions for accessing Internet content. For instance, an access policy indicator may comprise an indicator of a category of content that the respective client device should not access (e.g., adult content, social networks, online gambling, etc.). An access policy may further include a time indicator, for instance a time interval of applicability of the respective policy. An access policy may further include a location indicator indicative of a region of applicability of the respective policy. In one such example, one access policy may apply when the respective device is connected to local network 13 (e.g., while at home), and another policy may apply when the respective device is roaming. Another exemplary policy may apply only within the bounds of a pre-determined geofence. In some embodiments, an access policy may include an identifier of a user of the respective client device, indicating that the respective policy applies when the respective client device is operated by the respective user.

In some embodiments, a client record may comprise other data which may be relevant to an access policy. Examples include an indicator of a device type (e.g., digital camera, thermostat, smartphone, tablet computer, router, car), various hardware configuration indicators of the respective client device (e.g., whether the respective device has a camera, etc.), and a list of software applications installed on the respective device. Other information stored in an exemplary client record comprises device usage data, such as statistics of network access by the respective client device, for instance the relative frequency of using various communication ports, relative traffic volume during various time intervals, etc. Other exemplary client records may include metadata describing network traffic transmitted or received by the respective client device. In some embodiments, such metadata may be organized according to a format such as IP Flow Information Export (IPFIX) from the Internet Engineering Task Force, or NetFlow(R) from Cisco, Inc.

In some embodiments, policy database 42 may store records indicating collective access policies. One exemplary collective access policy applies to all devices having a specific device profile, as defined, for instance, by a tuple of device features such as a device type and operating system. In one such example, one access policy may apply to desktop computers and another to smartphones and tablet computers. In another example, an access policy may apply to all devices having an Android® operating system older than version 10, etc. Other collective access policies may apply to all devices belonging to a group or organization. In one such example, all devices connected to local network 13 may be defined by a collective access policy attached to network appliance 14. In yet another example, one access policy may apply to devices operated by employees from an engineering department, and another access policy may apply to devices operated by employees from the legal department of a company, etc.

Policy database 42 may be formatted and stored according to any standard known in the art. Exemplary database formats include a relational database, an extensible markup language (XML) database, a spreadsheet, and a key-value store, among others.

Security database 44 generically represents any collection of data enabling server 40 to determine whether accessing a particular Internet resource constitutes a computer security hazard, and/or to enforce an Internet access policy such as parental control. In a simple example, database 44 comprises a set of records indexed according to domain name, each record indicating a category of content stored at the respective domain. Exemplary categories include malicious content (e.g., malware, fraudulent webpages, phishing webpages, dark web, etc.), adult content, streaming, gambling, social networking, and gaming, among others. Security database 44 may be formatted and stored according to any standard known in the art.

In some embodiments, DNS server 20 provides domain name services to client devices 12a-e, the respective services comprising, inter alia, translating domain names into network addresses and/or vice versa by maintaining a mapping between domain names and network addresses. DNS server system 20 generically represents a set of communicatively coupled computers, such as an authoritative nameserver, a top-level domain nameserver, a root nameserver, etc.

A typical data transmission between a client device 12 and content server 16 comprises several steps. Such transmission requires knowledge of a network address (e.g., Internet Protocol—IP address) of server 16. Often, this address is not known to the client, for various reasons. For instance, there may be multiple mirror content server machines, and the client may be dynamically directed to the most convenient one according to the current load of each mirror server or according to the current geographical location of the client device. The client device may however know a domain name comprising an alias of the unknown network address. To establish a connection to content server 16, a software entity executing on the respective client device may thus issue a request to access the respective domain name, instead of the IP address per se. In response, another software entity (e.g., the operating system) of the client device may attempt to translate the alias/domain name to an actual network address, and subsequently transmit the request to the correct network location.

Figure 2:
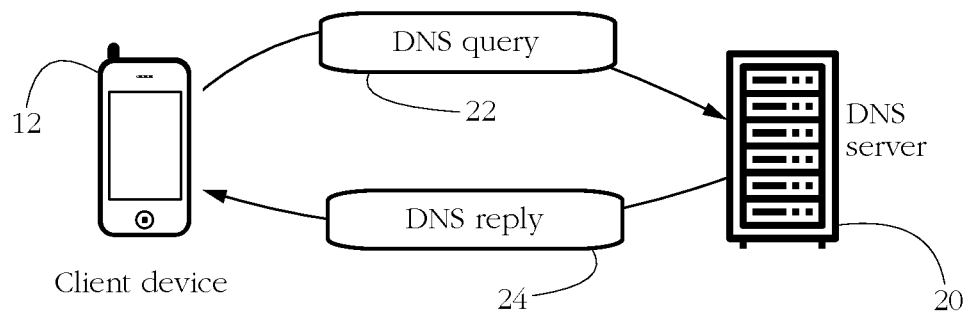
FIG. 2 shows a typical domain name service (DNS) transaction, as known in the art.

Translating domain names to network addresses (an operation also known in the art as domain name resolution) typically comprises client device 12 transmitting a DNS query 22 to DNS server 20, as illustrated in FIG. 2. Query 22 may comprise an encoding of a domain name and an indicator of a type of question Q, among others. The type of question indicates a type of DNS resource record returned by DNS server 20 in response to the respective query. Exemplary questions include 'A' which requests an IP address formulated in a 4th version of the Internet Protocol (IPv4), and 'AAAA' which returns an IP address formulated in a 6th version of the Internet Protocol (IPv6). Other exemplary questions/resource record types include 'TXT', 'PTR', 'LOC', etc. In response to query 22, DNS server 20 may return a DNS reply 24 to the requesting client, reply 24 including an encoding of a network address (e.g., IPv6 address) corresponding to the respective domain name/alias. An exemplary format of query 22 and reply 24 may be found in IETF RFC 1035, among others. In systems employing encrypted DNS protocols, query 22 and/or reply 24 may be encrypted at least in part, as described below.

Figure 3:
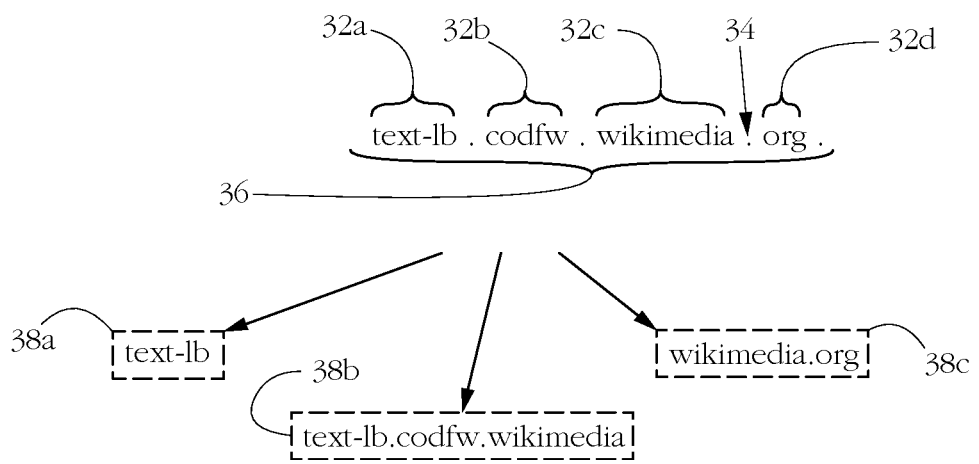
FIG. 3 illustrates a domain name as known in the art.

FIG. 3 illustrates an exemplary domain name of an Internet domain. The domain name may consist of a fully qualified domain name (FQDN) 36 that completely and unambiguously specifies the respective domain by way of an ordered sequence of tokens/labels 32a-d separated by a delimiter symbol 34 (in the illustrated example, a dot). A fragment of FQDN 36 comprising a subset/subsequence of the FQDN tokens 32a-d is commonly known as a partially qualified domain name (PQDN). Items 38a-c illustrate various exemplary PQDNs of FQDN 36. In contrast to FQDN 36, each PQDN 38a-c specifies the respective domain with some level of ambiguity, i.e., there may exist multiple FQDNs having the same characterizing PQDN. Resolving an FQDN to a corresponding IP address typically proceeds in an iterative fashion, each consecutive iteration progressing to a consecutive level of the domain name hierarchy, from a root level ('.') to a top level domain (TLD) level (e.g., com, net, fashion, tv, and country-indicative tokens such as ro, fr, etc.), to a domain level comprising tokens such as Wikipedia, Facebook, etc., and a subdomain level comprising various domain-specific prefix tokens. Each consecutive iteration may be determined according to a distinct token of FQDN 36 and may comprise sending a separate DNS query to a distinct component/machine of DNS server 20.

Figure 4:
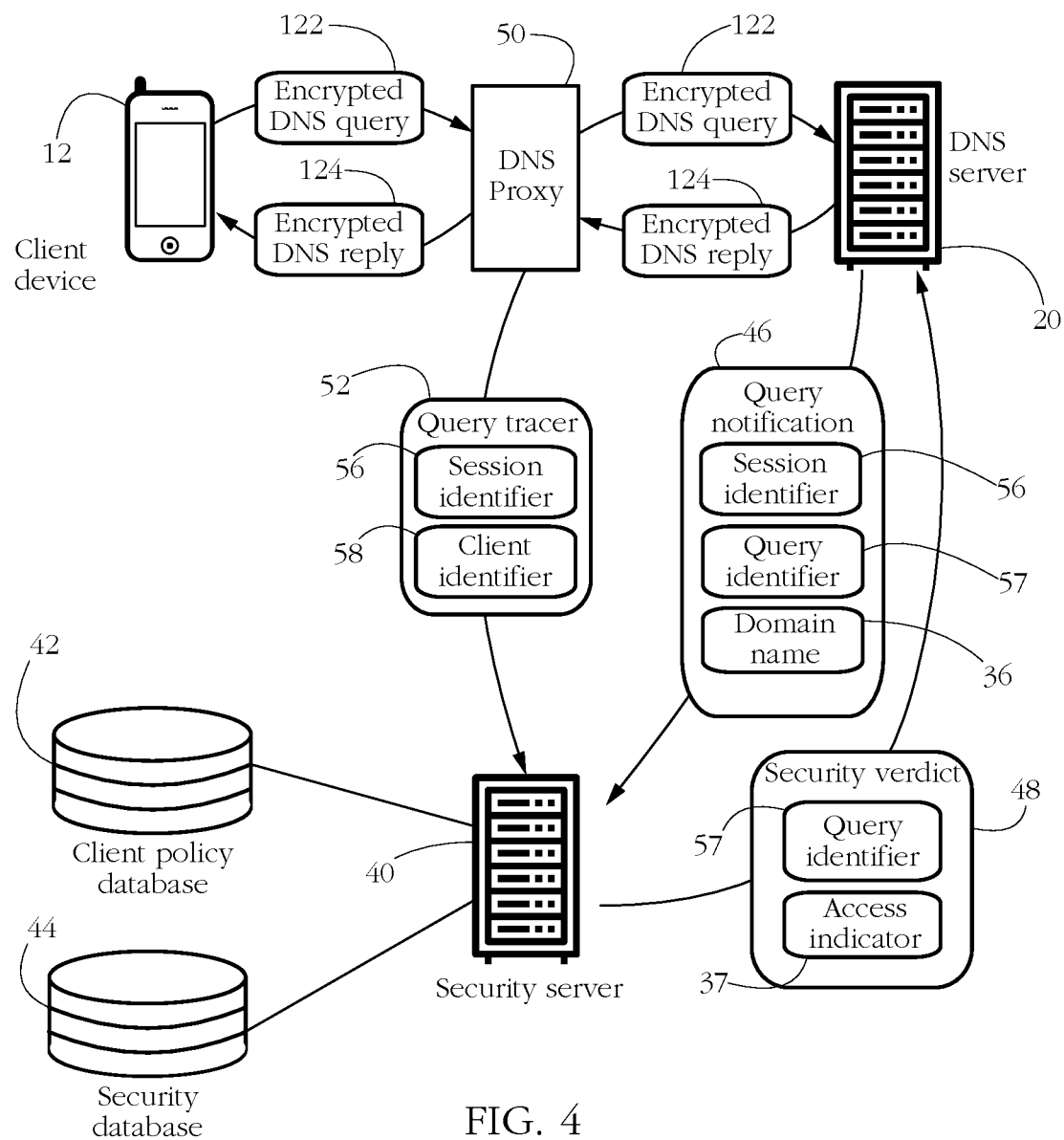
FIG. 4 shows exemplary message exchange between a client system, a DNS proxy, a DNS server, and a security server according to some embodiments of the present invention.

FIG. 4 shows an exemplary DNS exchange between client device 12 (which may represent any device 12a-e in FIG. 1) and DNS server 20 according to some embodiments of the present invention implementing a version of an encrypted DNS protocol, such as DNS over TLS or DNS over HTTPS, among others. In some embodiments, a DNS proxy module 50 acts as an intermediary between client device 12 and DNS server 20. DNS proxy 50 may be embodied as a computer program executing on a computing appliance connected to local network 13. In one example, DNS proxy 50 executes on network appliance 14 or on a router assigning network addresses to client devices on network 13. In an alternative embodiment, proxy 50 may execute on client device 12. In yet another example, the functionality of DNS proxy 50 may be divided between an agent executing on client device 12 and another agent executing on appliance 14.

In some embodiments, DNS proxy 50 is configured to intercept an encrypted DNS query 122 from client device 12 and to forward query 122 to DNS server 20. Proxy 50 may further receive encrypted DNS replies 124 from server 20 and forward them to client device 12. In some embodiments, queries 122 and/or replies 124 are forwarded unchanged to their intended recipient/network address. In some embodiments wherein client device 12 is configured to send query 122 to a preferred DNS server that is distinct from DNS server 20 described herein, DNS proxy 50 may forcefully redirect query 122 to DNS server 20. Query 122 may comprise ciphertext encoding a domain name, while reply 124 may comprise ciphertext encoding an IP address of the respective domain. In a simple example, encrypted DNS query 122 comprises an encryption of an entire DNS query (e.g., query 22 in FIG. 2), while encrypted DNS reply 124 comprises an encryption of an entire DNS reply (e.g., reply 24 in FIG. 2).

In some embodiments, DNS proxy 50 is further configured to determine a query tracer 52 associating DNS query 122 with its sender (i.e., client device 12), and to transmit query tracer 52 to security server 40. In turn, security server 40 may collaborate with DNS server 20 to enforce an access policy, which may comprise selectively allowing or denying access of client device 12 to an Internet domain indicated by a domain name included in encrypted DNS query 122 according to the domain name and according to an identity of client device 12 and/or of a user of client device 12. Such collaboration is further detailed below.

Figure 5:
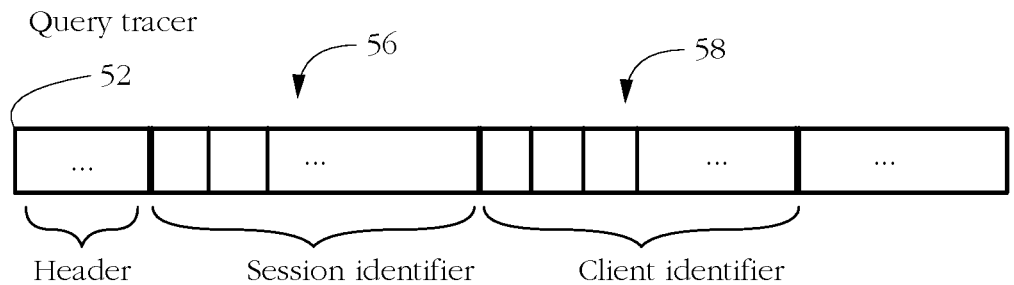
FIG. 5 illustrates a query tracer according to some embodiments of the present invention.

In some embodiments, query tracer 52 comprises a data structure associating DNS query 122 with its originating entity—client device 12. An exemplary query tracer 52 may comprise an identifier of DNS query 122 and an identifier of client device 12. When communication protocols allow multiple DNS queries to be carried out over the same encrypted session, another exemplary query tracer 52 comprises a session identifier 56 identifying the respective session and a client identifier 58 identifying of client device 12, as shown in FIG. 5. A skilled artisan will know that the format and encoding of query tracer 52 may vary and that the illustrated embodiment is not meant to be limiting. ID's 56-58 may be sent together within the same transmission, or in separate messages/data packages. When ID's 56-58 are sent separately, the respective transmissions may include a tag (e.g., identifying hash) enabling server 40 to associate the session identifier 56 with client identifier 58.

Figure 6:
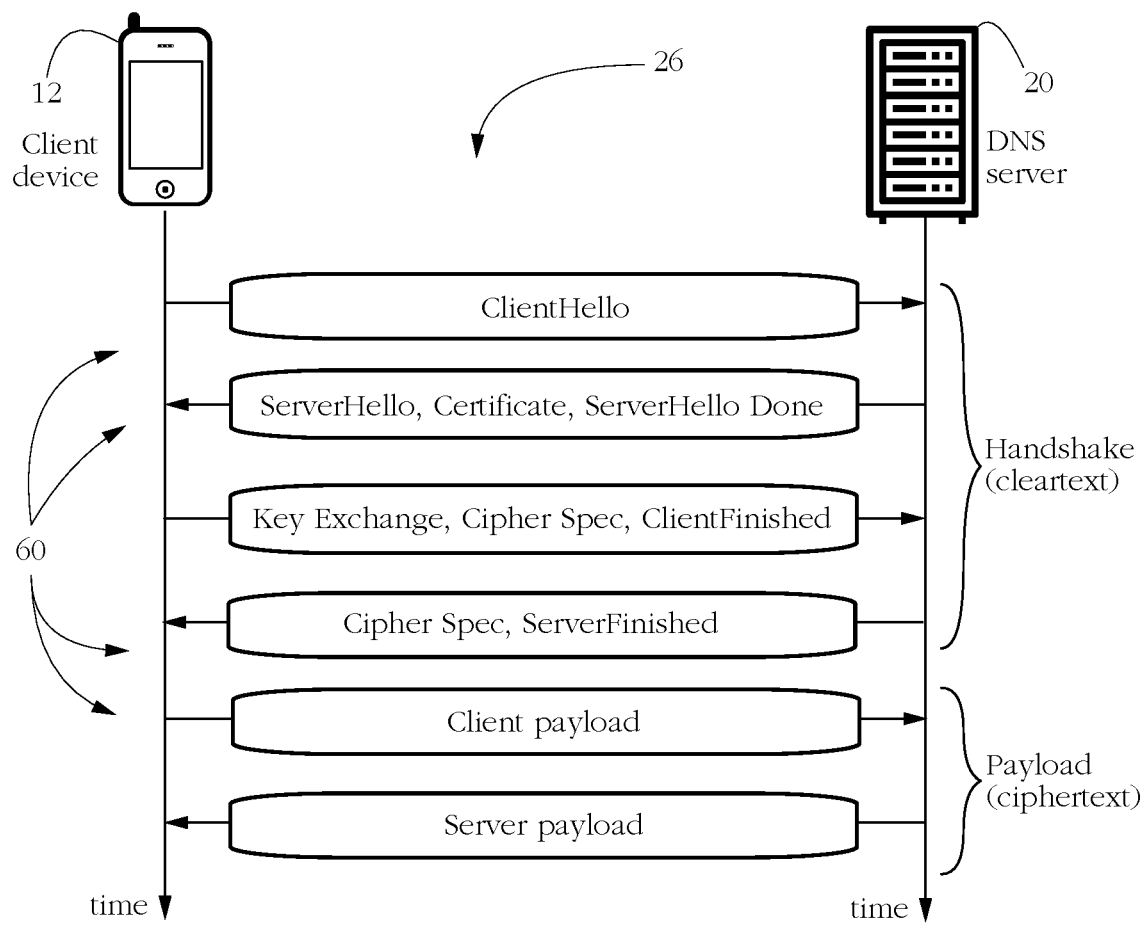
FIG. 6 shows an exemplary encrypted communication session carried out according to a transport layer security (TLS) protocol.

FIG. 6 shows an exemplary encrypted communication session 26 carried out according to a version of the TLS protocol. Such sessions may include DNS exchanges carried out in DNS over TLS and/or DNS over HTTPS protocols. A skilled artisan will know that the use of TLS herein is only exemplary and not meant to be limiting. As illustrated, an encrypted communication session comprises multiple messages (often referred to in the art as TLS records 60). Records 60 may be grouped into a handshake part/exchange and a payload part/exchange. Handshake records are sent in preparation for transmittal of the payload, are typically formulated in cleartext (unencrypted), and comprise various metadata such as parameter values for establishing a connection between the respective communication parties, and various cryptographic parameter values required for encrypting and/or decrypting the payload. Taking the example of TLS, a 'ClientHello' handshake record may comprise a random number used in deriving cryptographic keys (known as a ClientRandom) and may further indicate a list of ciphers that client 12 currently supports. A 'ServerHello' handshake record may comprise another random number used in deriving cryptographic keys (known as a ServerRandom), an indicator of a choice of cipher, and a public key of server 20, among others. Other handshake records may include metadata such as a record type and a record size of the respective record, and a checksum used for verifying the integrity of a record, among others.

The handshake is typically followed by transmission of a payload encrypted according to parameter values determined and/or exchanged during the handshake. In the example of FIG. 6 applied to encrypted DNS, an exemplary client payload may include a domain name, while an exemplary server payload may include an IP address of the respective Internet domain. In some cases, multiple encrypted DNS queries and/or replies are exchanged sequentially within the same session, i.e., the respective queries and/or replies are encrypted according to session-specific cryptographic keys, so individual queries and/or replies do not require separate handshakes.

Figure 7:
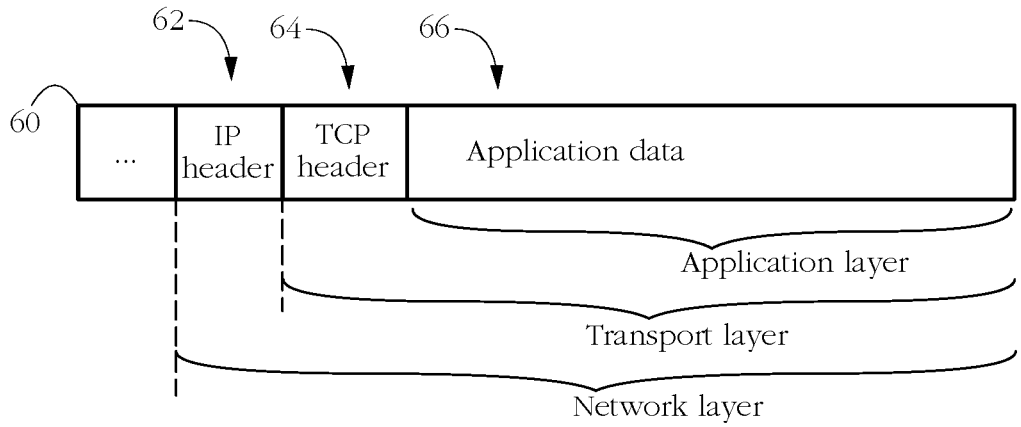
FIG. 7 shows a typical layout of a TLS record, as known in the art.

DNS proxy 50 may operate at various levels of a networking protocol suite, wherein said levels herein refer to an open system interconnection (OSI) model. FIG. 7 illustrates an exemplary, generic TLS record 60 (which may represent any TLS record illustrated in FIG. 6, such as a 'Client Hello' record, among others) from an OSI perspective. When intercepted at application level, record 60 may consist of a set of application data 66. However, when proxy 50 intercepts DNS exchanges at a transport level, record 60 may be encapsulated with a transmission control protocol (TCP) header 64. Similarly, when intercepted at a network level, record 60 may be further encapsulated with an internet protocol (IP) header 62. Such headers are herein given merely as examples and may vary according to communication protocol and network architecture.

Figure 8:
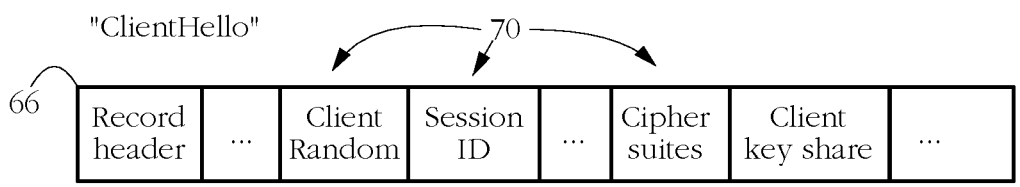
FIG. 8 illustrates exemplary components of a "Client Hello" TLS record.

FIG. 8 illustrates exemplary application data 66 of a 'Client Hello' TLS record, comprising multiple metadata fields 70 including a ClientRandom and a SessionID fields, among others. In some versions of TLS, the ClientRandom field contains a 256-bit random number generated by client device 12 during handshake procedures, said random number further used by client device 12 and server 20 to generate session-specific cryptographic keys. Some embodiments rely on the observation that since a new ClientRandom value is generated with each handshake, the respective value may effectively identify a respective DNS session and/or query, alone or in combination with other query metadata (the same argument applies to a content of a ServerRandom field of a handshake exchange, the ServerRandom transmitted by server 20 to client device 12). The SessionID field contains an identifier of the current exchange, which further uniquely identifies the respective session-specific cryptographic keys, allowing client device 12 and server 20 to exchange multiple payloads without renegotiating a handshake. For instance, using the same SessionID value allows encrypting and/or decrypting DNS query 122 and DNS reply 124 with the same session-specific keys. Some embodiments rely on the observation that such properties allow using the SessionID value to identify DNS session 26, DNS query 122 and/or reply 124. However, session identifier 56 is not limited to, and need not have the same format as the SessionID field. Instead, some embodiments may use a content of the SessionID field in combination with other data when computing session identifier 62.

Figure 9:
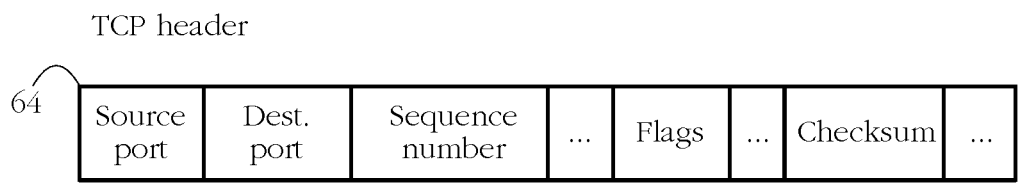
FIG. 9 shows typical components of a transmission control protocol (TCP) header as known in the art.

FIG. 9 illustrates components of an exemplary TCP header 64 as known in the art. Header 64 comprises a concatenation of multiple metadata fields, such as a Source Port, a Destination Port, and a set of flags/control bits, among others. TCP header flags may be used to set a priority for the current data packet, to reset, or to finish a connection/session, for instance. Header 64 may also comprise a SequenceNumber field, which may contain a 32-bit random number identifying the current TCP session. Header 64 may further comprise a Checksum field containing a hash of at least a part of header 64, which may be used to verify the integrity of header 64. Some embodiments rely on the observation that identifiers of a TCP session, such as a value on the SequenceNumber field and a value of the Checksum field, may be used to identify an encrypted session and/or a DNS query. However, since the range of the respective value is not broad enough to avoid collisions (e.g., multiple queries/sessions accidentally having the same values of SequenceNumber), such values may be preferably used in combination with other query metadata in calculating session identifier 56.

Figure 10:
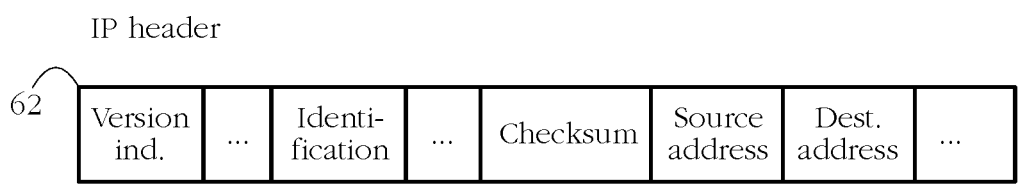
FIG. 10 shows typical component of an internet protocol (IP) header as known in the art.

FIG. 10 illustrates components of an exemplary IP header 62 as known in the art. Header 62 comprises a concatenation of metadata fields such as a source IP address (containing a network address of the sender), destination IP address (containing a network address of the intended receiver), and a packet identifier among others. Header 62 may further comprise a Checksum field containing a hash of at least a part of header 62, which may be used to verify the integrity of header 62. Some embodiments rely on the observation that the source IP address may be used in combination to other query metadata to identify DNS session 26 and/or DNS query 122.

In some embodiments, DNS proxy 50 and/or DNS server 20 may determine session identifier 56 according to a cleartext (i.e., unencrypted) part of encrypted communication session 26, for instance according to a content of a handshake record. In a preferred embodiment, session identifier 56 is determined according to a content of a 'ClientHello' TLS record, for instance according to a content of a ClientRandom, ServerRandom, and/or a SessionID fields. In one simple example, to determine query tracer 52 DNS proxy 50 may copy the content of the ClientRandom field into session identifier 56.

Some embodiments determine session identifier 56 according to a content of a TCP header of a data packet forming part of encrypted session 26, for instance according to a content of the SequenceNumber field and/or a content of the Checksum field of the respective TCP header. Some embodiments determine session identifier 56 according to a content of an IP header of a data packet forming part of session 26, for instance according to a content of a SourceAddress field, a content of the Identification field, and/or a content of the Checksum field of the respective IP header.

An exemplary calculation of session identifier 56 may comprise combining and/or transforming a set of data extracted from various header and/or application data fields. One example may concatenate a SourceAddress extracted from IP header 62 with a SequenceNumber extracted from TCP header 64, and apply a hash function to the result. An artisan will understand that there may be many ways of combining and/or transforming a set of data, not limited to hashing.

In some embodiments, client identifier 58 (FIG. 5) comprises a set of data that distinguish client device 12 from other client devices. Exemplary client identifiers include a MAC address, an IMEI number, and a local network address, among others. In some embodiments, client identifier 58 may not identify each client device individually, but is instead indicative of a group identity of the respective client device. For instance, client identifier 58 may selectively indicate a device group (e.g., devices within a certain department of a corporation, devices located within a certain network sub-domain, devices belonging to a certain home network). In such embodiments, client identifier 58 may include an IP address of the originator of the respective DNS query.

In some embodiments, client identifier 58 comprises an identifier of network appliance 14. In one such example, client devices 12*a-e* belong to a family, local network 13 represents a home network, and all devices 12*a-e* are protected against computer security threats under a single service agreement attached to network appliance 14. In such embodiments, including an identifier of appliance 14 in client identifier 58 allows security server 40 to selectively identify an access policy according to the service agreement attached to the respective network appliance 14.

Another exemplary client identifier 58 may comprise an indicator of a device profile, therefore allowing security server 40 to selectively retrieve an access policy associated with the respective device profile from policy database 42. Exemplary device profile information may include, for instance, an indicator of a device type (e.g., smartphone vs. desktop PC, etc.), an indicator of an operating system executing on the respective client device (e.g., which version of Android® the originator of query 122 is currently executing), a geolocation indicator indicative of a current geographical location of the respective client device (indicating, for instance, whether the respective device is currently connected to local network 13 or roaming), an indicator of a type of application that issued the current DNS request (e.g., browser, social media app, banking app, etc.) and an identifier of a current user of the respective client device. To determine such data, some embodiments of DNS proxy 50 may collaborate with a software agent executing on client device 12 and/or on network appliance 14. In one such example, when introduced to local network 13, appliance 14 may perform a device discovery procedure to determine a device type of each device 12*a-e*, among others. Appliance 14 may then share such device-identifying data with DNS proxy 50.

Figure 11:
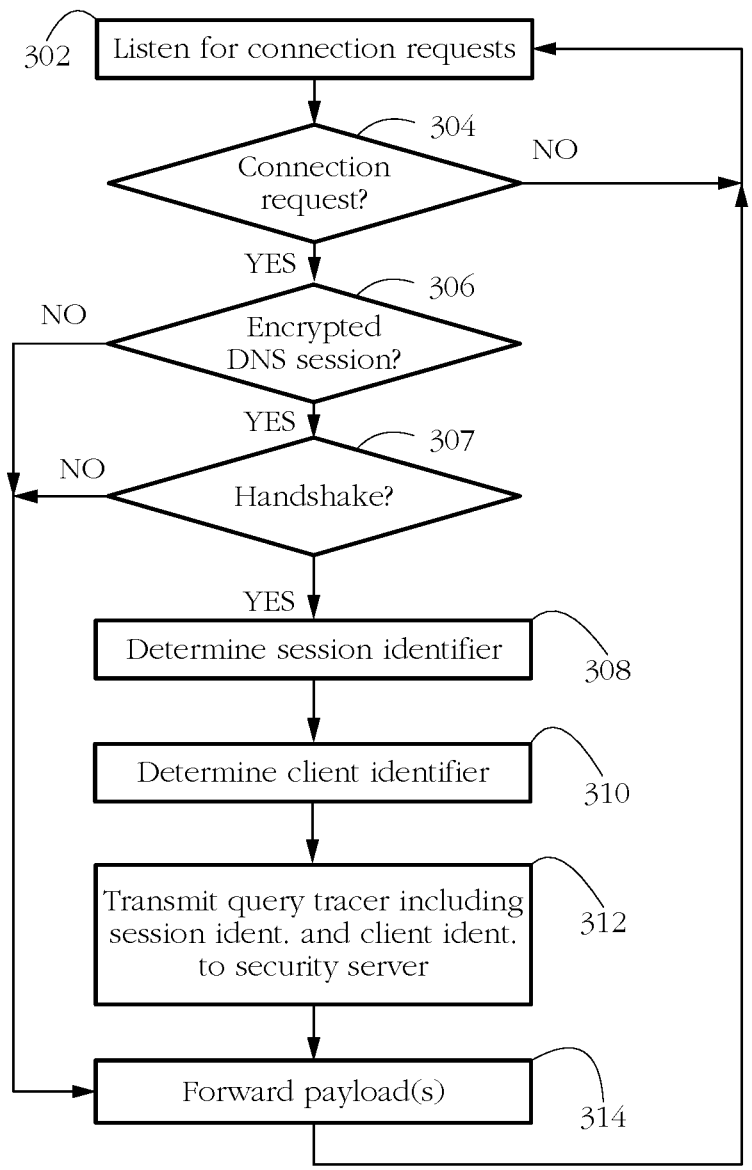
FIG. 11 illustrates an exemplary operation of a DNS proxy according to some embodiments of the present invention.

FIG. 11 shows an exemplary sequence of steps carried out by DNS proxy 50 in an embodiment as illustrated in FIG. 4. Proxy 50 may be placed in a position where it can intercept communications to and/or from client devices 12*a-e*. Intercepting an incoming communication herein comprises receiving and analyzing metadata of the respective communication without decrypting the payload. In one example, DNS proxy 50 may execute on a gateway device intermediating data traffic between local network 13 and extended network 15/the Internet (e.g., on a network appliance 14 as illustrated in FIG. 1). In a sequence of steps 302-304, proxy 50 may listen for connection requests (e.g., TCP requests) from clients 12*a-e* and/or DNS server 20. When a request is received, a step 306 may determine whether the respective request is related to DNS activities. Since incoming communications may be encrypted, it may not be possible to discriminate between DNS messages and other data according to a content of the respective communications. However, some embodiments may identify DNS traffic according to communication metadata such as a destination IP address (e.g., by matching the destination IP address to a list of addresses of known DNS servers), and/or a port number (e.g., conventional unencrypted DNS protocol typically uses port 53, encrypted DNS typically uses ports 443 or 853). Some embodiments simply forward non-DNS traffic to its intended destination (step 306 returns a NO).

When the respective connection request is related to DNS traffic (step 306 returns a YES), a step 307 determines whether the transmitted data forms a part of a handshake exchange. Stated otherwise, step 307 may determine whether the received request initiates a new encrypted communication session. When no, a step 314 may forward the respective payload to its intended destination. When the intercepted communication comprises handshake data (step 307 returns a YES), a step 308 may determine session identifier 56 according to any of the methods and data items described above in relation to FIGS. 4-10. A further step 310 may determine client identifier 58, for instance according to a network address of a sender of the respective message. In some embodiments, in step 310 DNS proxy 50 may receive extra client- and/or query-identifying information from a software agent executing on client device 12. In a step 312, DNS proxy 50 may assemble query tracer 52 and transmit tracer 52 to security server 40. Proxy 50 may then forward the respective payload to its intended destination. In some embodiments, step 314 comprises actively re-routing DNS-related communications received from clients 12*a-e* to a preferred DNS server irrespective of their original destination, thereby forcing clients to use DNS server 20 for domain name resolution activities.

To protect multiple client devices by filtering Internet access, some embodiments of security server 40 maintain a mapping between DNS queries and devices/users, enabling server 40 to determine which device and/or user a DNS query belongs to. In some embodiments wherein multiple queries may be performed within the same encrypted communication session, server 40 may map each session 26 to a corresponding device 12. All queries forming part of the respective session may then be associated with the respective client device. Said mapping may be implemented using any method known in the art, for instance as a table, a relational database, etc. In some embodiments, server 40 uses session identifier 56 as a lookup key/index into the respective table or database to determine which client device and/or user sent which DNS query. In response, server 40 may access a device-specific and/or user-specific access policy associated with the respective device. However, since DNS queries may be encrypted, security server 40 may not be aware of domain name 36 included in each query. Instead, some embodiments of security server 40 may receive the respective domain name from DNS server 20.

In some embodiments as illustrated in FIG. 4, in response to receiving and decrypting DNS query 122, DNS server 20 transmits a query notification 46 associating an identifier of query 122 with a domain name 36 included in the respective query. An exemplary format of query notification 46 is shown in FIG. 13, but a skilled artisan will understand that the illustrated format is not meant to be limiting. Queries may be identified collectively according to session identifier 56, and/or individually according to a query identifier 57 distinguishing the respective query from other queries transmitted within the same session, or from other queries resolved by server 20. Query notification 46 may further comprise domain name 36 and/or a result of resolving domain name 36 (e.g., IP address 28). Although the illustrated example shows a fully qualified domain name, some query notifications 46 may include PQDNs or other fragments of a domain name. In some embodiments, query notifications 46 may include data characterizing multiple queries. In one such example, notification 46 includes session identifier 56 and a plurality of {query identifier, domain name} tuples corresponding to individual DNS queries carried out within the same encrypted communication session identified by session identifier 56.

Session identifier 56, query identifier 57, and domain name 36 may be transmitted as separate messages/data packages; in such cases, each individual message may comprise a label/tag (e.g., an identical hash) allowing server 40 to associate ID's 56 and/or 57 with domain name 36. In one such example, security server 40 may send a first message comprising session identifier 56 to DNS server 20, and DNS server 20 may respond with another message comprising at least a query identifier 57 and a domain name 36. The response may further include an indicator (e.g. hash) associating the respective response with the first message sent by security server 40, thereby associating domain name 36 and/or query identifier 57 with session identifier 56.

In some embodiments, security server 40 combines the session-to-client association provided by query tracer 52 with the query-to-domain association provided by query notification 46 to associate domain names with client devices and/or users, which enables applying a device-specific and/or user-specific policy to determine whether to allow the respective client device/user access to the Internet resource indicated by domain name 36.

Figure 12:
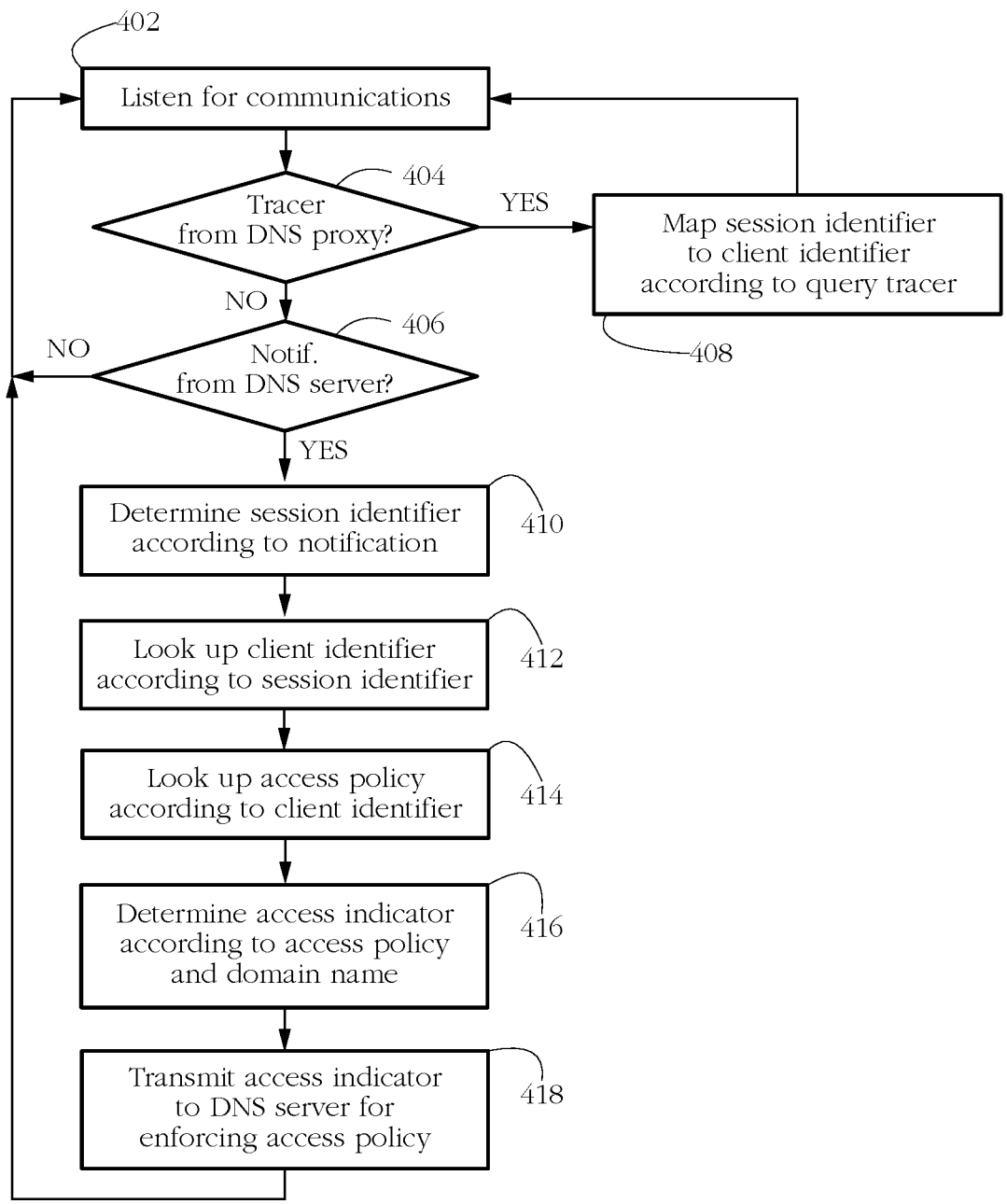
FIG. 12 shows an exemplary sequence of steps carried out by a security server according to some embodiments of the present invention.

FIG. 12 shows an exemplary sequence of steps performed by security server 40 in an embodiment as illustrated in FIG. 4. A step 402 may listen for incoming communications. When an incoming communication comprises query tracer 52 from DNS proxy 50 (a step 404 returns a YES), in a step 408 server 40 may parse the contents of query tracer 52 and map session identifier 56 to client identifier 58, for instance by creating a new table entry associating IDs 56 and 58.

When security server receives notification 46 from DNS server 20 (a step 406 returns a YES), a step 410 may identify a communication session and/or a query according to notification 46, for instance by parsing notification 46 to extract session identifier 56 and/or query identifier 57. In a step 412, server 40 may then use session-to-client mappings described above to find a client identifier indicative of a client device 12a-e and/or a user that generated the respective DNS query(ies). A step 414 may look up an access policy associated with the respective client identifier in policy database 42.

A further step 416 may determine an access indicator 37 according to a result of determining whether the access policy retrieved in step 414 specific to the respective client device and/or user allows accessing a domain identified by domain name 36. In a simple example, access indicator 37 comprises a flag (e.g., a bit) which, when set, indicates denying access of client device 12 to the respective domain. In another example, access indicator 37 comprises an indicator of an action to be performed in response to an attempt by the respective client device to access the respective domain (for instance, allow, block, redirect, display warning page, etc.).

Step 416 may comprise evaluating domain name 36 according to the access policy and possibly according to other data such as a current user of client device 12, a current time of the day, a current physical location of client device, etc. Step 416 may further include looking up domain name 36 in security database 44 to determine whether accessing an Internet domain having domain name 36 may constitute a computer security threat. For instance, security database 44 may indicate that domain name 36 is blacklisted for being associated with fraud, phishing, malicious software, pornography, online gambling, etc.

In response to determining access indicator 37, in a step 418 security server 40 may transmit access indicator 37 to DNS server 20. In some embodiments, access indicator 37 is bundled together with query identifier 57 into a security verdict 48, enabling a recipient of verdict 48 to associate access indicator 37 with a specific query, client device and/or communication session. In one such example, DNS server 20 maintains a mapping between queries 122 and access indicators 37, for instance by means of a table having query identifier 57 as lookup key/index.

Figure 14:
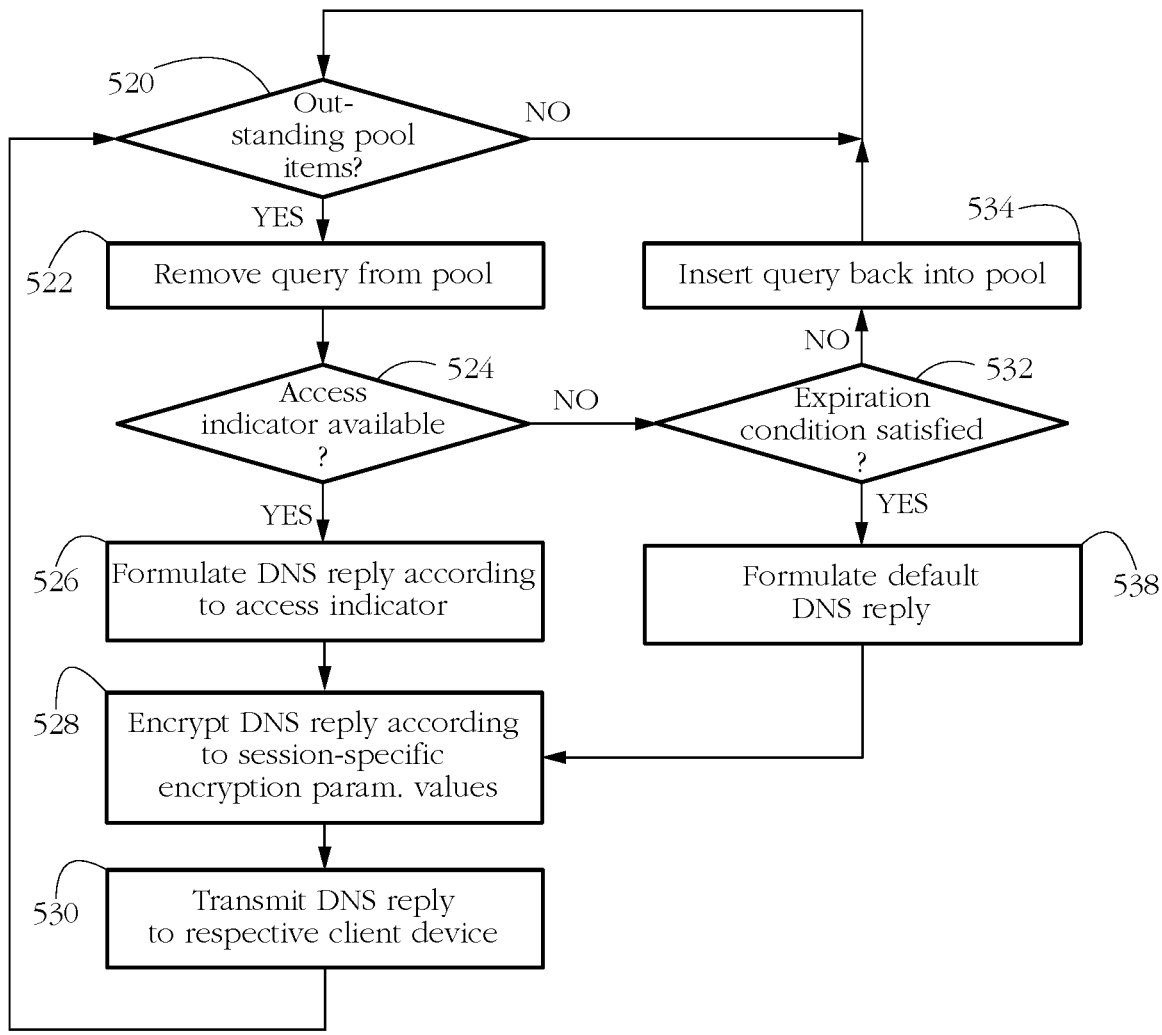
FIG. 14-A shows an exemplary sequence of steps carried out by a DNS server according to some embodiments of the present invention.

FIGS. 14-A-B show exemplary sequences of steps carried out by DNS server 20 in embodiments as illustrated in FIG. 4. The two sequences (FIGS. 14-A and 14-B, respectively) may be carried out asynchronously, by distinct computer programs and/or hardware modules of DNS server 20.

A step 502 may listen for incoming communications. In response to receiving a communication, a step 504 may determine whether the respective communication was received from security server 40. When yes, indicating that the respective communication comprises a security verdict/access indicator, in a step 506 server 20 may parse security verdict 48 to identify the DNS query that verdict 48 refers to, and update a stored mapping to associate the current access indicator 37 with the respective query identifier 57.

When the incoming communication comprises a part of an established session and comprises an encrypted DNS query (a step 508 returns a YES), a step 509 determines an identifier of the respective session. Step 509 may be carried out according to any of the methods and data sources described above in relation to FIGS. 6-10, as long as the instance of the session identifier calculated by DNS proxy 50 and the instance of the session identifier calculated by DNS server 20 coincide for the same session. In a step 510, DNS server 20 may proceed to decrypt the DNS query included in the respective communication, to produce domain name 36. A step 512 may assign a query identifier to the respective query to distinguish it from other queries of the same session. An artisan will know that there may be many ways of generating unique identifiers; step 512 may use any method known in the art to produce query identifier 57.

In a step 513, DNS server 20 may carry out a domain resolution procedure to produce a network address (e.g. IP address) of a domain having domain name 36. Domain name resolution may comprise multiple DNS queries addressed to various sub-systems of server 20, as described above in relation to FIG. 3. A step 514 may then assemble query notification 46 comprising session identifier 56, query identifier 57, and domain name 36, and transmit notification 46 to security server 40.

In some embodiments, DNS server 20 places incoming queries into a pool (step 516 in FIG. 14-A) to await the receipt of the respective access indicators from security server 40. Such pooling may allow server 20 to process incoming queries asynchronously and thus prevent problems created by occasional communication and processing delays. The query pool may be embodied using any method known in the art, e.g., a queue, a stack, etc. FIG. 14-B shows exemplary steps carried out by DNS server 20 to process an accumulated pool of DNS queries, according to some embodiments of the present invention. A step 520 determines whether there are currently any outstanding queries in the pool. When yes, a step 522 selects a query and removes the selected query from the pool. A step 524 may look up a data structure mapping queries to access indicators to determine whether an access indicator has been received in relation to the selected query. When no access indicator 37 currently exists for the respective query, the selected query may be returned to the query pool (step 534). In some embodiments, a step 532 determines whether an expiration condition is satisfied (for instance, whether a time elapsed since the selected query was received at server 20 exceeds a pre-determined threshold), and only return the selected query to the query pool when the expiration condition is not satisfied. When the expiration condition is satisfied, in a step 538 some embodiments formulate a default DNS reply, for instance including an error code.

When an access indicator is currently available for the selected query (step 524 returns a YES), a step 526 may formulate a DNS reply according to access indicator 37. The respective DNS reply may include an IP address, for instance the address determined in step 513 or a substitute/dummy IP address redirecting client device 12 to an alternative Internet domain, to a warning page, etc. In some embodiments, when indicator 37 instructs server 20 to block access, the respective DNS reply may include an NXDOMAIN error code. A further sequence of steps 528-530 may encrypt the respective reply and transmit encrypted DNS reply 124 to the sender of the selected query, via DNS proxy 50.

The description above mostly addressed exemplary embodiments as illustrated in FIG. 4, wherein the entity ultimately enforcing an access policy (i.e., allowing or denying access to a particular domain) is DNS server 20, while DNS proxy 50 simply forwards incoming DNS messages to their intended recipient. In an alternative embodiment, security server 40 transmits security verdict 48 to DNS proxy 50 (as opposed to DNS server 20 as shown in FIG. 4). In turn, DNS proxy 50 may actively enforce an access policy according to verdict 48. However, DNS proxy 50 may not be able to distinguish between individual queries transmitted within the same session, since the respective communications are encrypted. In such cases, one exemplary way proxy 50 can enforce an access policy comprises terminating a whole session when the access indicator associated with at least one query of the respective session indicates blocking access to the respective domain.

Figure 16:
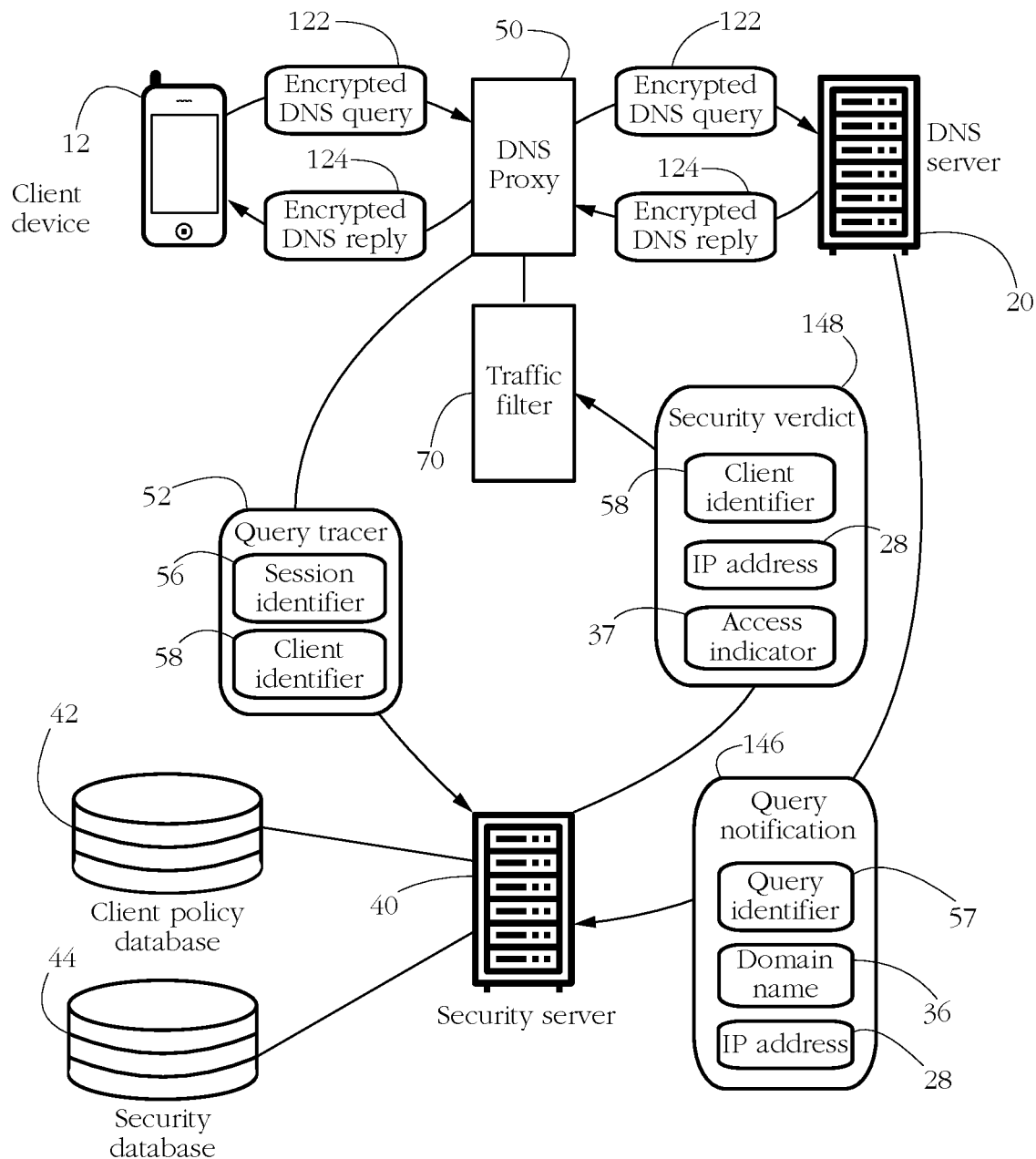
FIG. 16 shows an exemplary alternative message exchange according to some embodiments of the present invention.

To avoid such indiscriminate session termination, some embodiments enforce an access policy by not interfering with DNS transactions, but instead selectively allowing or preventing a selected client device from connecting to an IP address resulting from resolving a DNS query. One such example illustrated in FIG. 16 shows an exemplary traffic filter 70 communicatively coupled to DNS proxy 50 and configured to intercept an access request 72 comprising a request to access IP address 28, for instance as part of accessing an Internet resource hosted by content server 16. Some embodiments of traffic filter 70 may intercept such requests at a transport layer of an OSI network model (e.g., at TCP level). In some embodiments, traffic filter 70 is configured to prevent request 72 from reaching server 16 in response to receiving a security verdict 148 from security server 40, wherein access indicator 37 indicates that the requesting client device 12 (identified by ID 58) should be prevented from accessing IP address 28. In some embodiments, both DNS proxy 50 and traffic filter 70 may be embodied as hardware and/or software components executing on a network gateway such as network appliance 14 in FIG. 1, i.e., on a device traversed by traffic between clients 12*a-e* and content server 16.

FIG. 16 shows an exemplary message exchange involving traffic filter 70 according to some embodiments of the present invention. In some embodiments as illustrated in FIG. 16, the operation of DNS proxy 50 may proceed according to the exemplary flowchart shown in FIG. 11. In response to receiving query tracer 52, some embodiments of security server 40 may ask DNS server 20 for a result of resolving at least a query belonging to the encrypted session identified by session identifier 56. In one such example, security server 40 may send session identifier 56 to DNS server 20. In turn, DNS server 20 may transmit a query notification 146 to security server 40, including at least one tuple comprising a query identifier 57, a domain name 36, and an IP address 28 corresponding to a query of the respective session. In some embodiments, notification 146 enables server 40 to associate the query identified by ID 57 with the session identified by session identifier 56, and further to a client identified by client identifier 58 according to session-to-client mappings maintained by server 40, as shown above in relation to FIG. 4.

In some embodiments, security server 40 may then access client-specific and/or user-specific access policies according to client identifier 58, and determine access indicator 37 as described above in relation to FIG. 12. However, in contrast to step 418 in FIG. 12, server 40 may transmit access indicator 37 to traffic filter 70 for enforcing access policy. In some embodiments as shown in FIGS. 15-16, indicator 37 is bundled together with client identifier 58 and IP address 28, enabling filter 70 to enforce access policy by selectively blocking requests to access the respective IP address when the respective requests come from clients identified by the respective client identifier.

Figure 15:
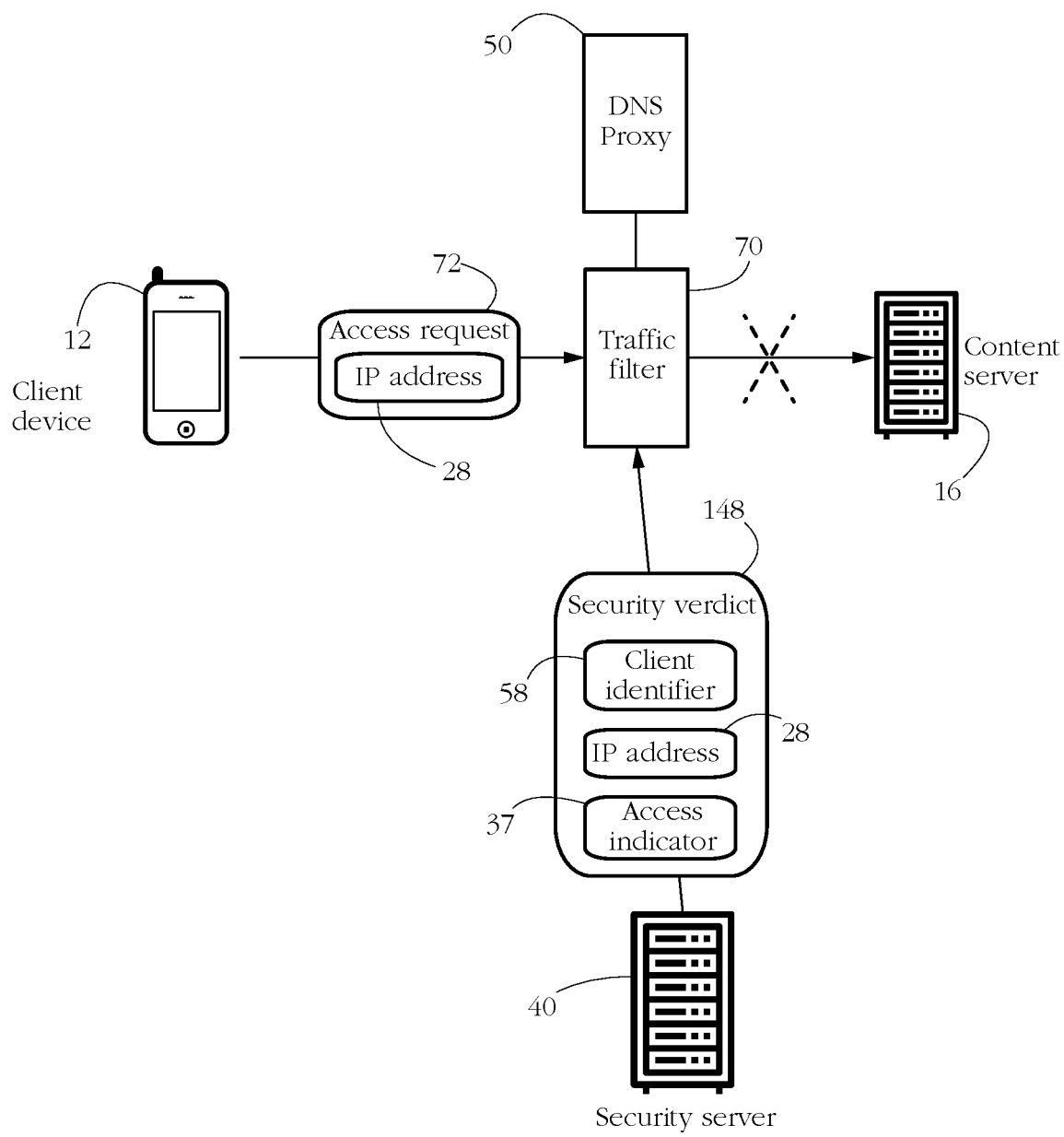
FIG. 15 illustrates an exemplary operation of a traffic filter according to some embodiments of the present invention.

FIGS. 17-A-B show exemplary sequences of steps carried out by traffic filter 70 in embodiments as illustrated in FIGS. 15-16. The two sequences (FIGS. 17-A and 17-B, respectively) may be carried out asynchronously, by distinct computer programs and/or hardware modules of traffic filter 70.

A step 602 may listen for incoming communications, which may comprise security verdicts 146 from server 40 and access requests 72 from clients. When receiving communications from security server 40 (a step 604 returns a YES), in a step 606 filter 70 may parse verdict 146 and map IP address 28 to client identifier 58 and access indicator 37. When intercepting an access request (a step 608 returns a YES), in a step 610 filter 70 may determine a client identifier of the client device requesting access. A further step 612 may map access request 72 to client identifier 58.

Some embodiments of traffic filter 70 maintain a pool (e.g. a queue) of pending access requests, wherein incoming requests are delayed until receiving the respective access indicators from security server 40. Pooling requests may allow filter 70 to process access requests asynchronously, thus improving user experience. In such embodiments, a step 614 may add the current request to the request pool. A step 620 (FIG. 17-B) may determine whether the pool currently has outstanding items, and when yes, a step 620 may select and remove an access request from the pool. In a step 624, filter 70 may determine whether it has already received an access indicator associated with an IP address of the selected request. Step 624 may look up the respective IP address in a mapping (e.g., a table associating IP addresses with client identifiers and access indicators, see above in relation to step 606). When no access indicator is currently registered for the respective IP address and client identifier, some embodiments may insert the selected access request into the request pool (step 632). Some embodiments may verify first whether an expiration condition is satisfied, and only return the selected request to the pool when a step 630 returns a NO. When the expiration condition is satisfied, in a step 634 some embodiments of filter 70 may prevent access to the respective IP address.

When the mapping maintained by filter 70 currently stored an access indicator 37 corresponding to a tuple of the respective IP address and client identifier (step 624 returns a YES), a further step 626 determines whether the respective access indicator allows access to the respective IP address. When yes, a step 628 may forward the selected access request to content server 16. When no, some embodiments block the selected access request.

Figure 18:
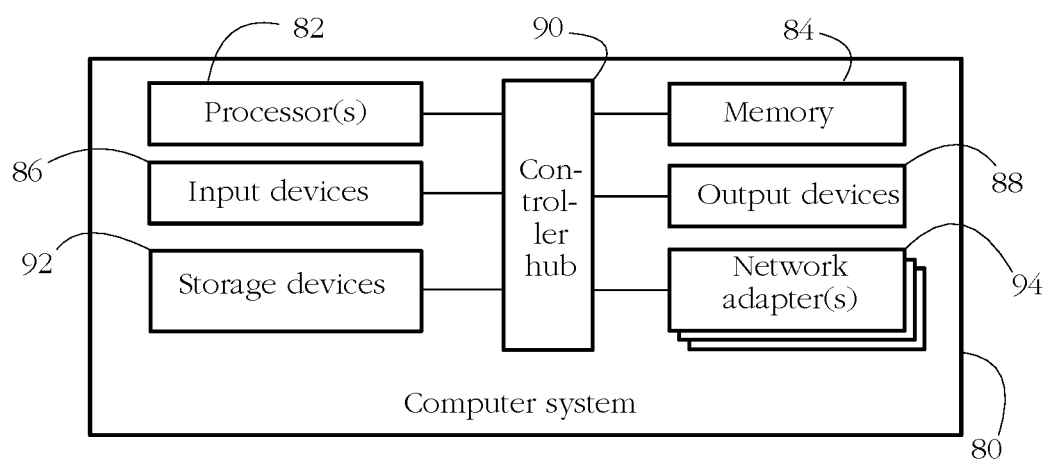
FIG. 18 illustrates an exemplary hardware configuration of a computing appliance programmable to carry out methods and algorithms according to some embodiments of the present invention.

The description above showed various methods and algorithms which may be embodied as computer programs executed by a general-purpose hardware processor, but a skilled artisan will understand that the respective functionality may also be implemented using dedicated hardware components, such as an application-specific integrated circuit (ASIC) or field-programmable gate array (FPGA). FIG. 18 illustrates an exemplary hardware configuration of a computer system 80 programmable to carry some of the methods and algorithms described herein. The illustrated configuration is generic and may represent for instance any of client devices 12a-e, network appliance 14, DNS server 20, and security server 40, among others. An artisan will know that the hardware configuration of some devices (e.g., mobile telephones, smartwatches, servers, routers) may differ somewhat from the one illustrated in FIG. 18.

The illustrated computer system comprises a set of physical devices, including a hardware processor 82 and a memory unit 84. Processor 82 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 82 in the form of a sequence of processor instructions (e.g. machine code or other type of encoding). Memory unit 84 may comprise volatile computer-readable media (e.g. DRAM, SRAM) storing instructions and/or data accessed or generated by processor 82.

Input devices 86 may include computer keyboards, mice, and microphones, among others, including the respective hardware interfaces and/or adapters allowing a user to introduce data and/or instructions into the respective computer system. Output devices 88 may include display devices such as monitors and speakers among others, as well as hardware interfaces/adapters such as graphic cards, allowing the illustrated computing appliance to communicate data to a user. In some embodiments, input devices 86 and output devices 88 share a common piece of hardware, as in the case of touch-screen devices. Storage devices 92 include computer-readable media enabling the non-volatile storage, reading, and writing of software instructions and/or data. Exemplary storage devices 92 include magnetic and optical disks and flash memory devices, as well as removable media such as CD and/or DVD disks and drives. The set of network adapters 94, together with associated communication interface(s), enables the illustrated computer system to connect to a computer network such as local network 13 (FIG. 1) and/or to other devices/computer systems. Controller hub 90 generically represents the plurality of system, peripheral, and/or chipset buses, and/or all other circuitry enabling the communication between processor 82 and devices 84, 86, 88, 92, and 94. For instance, controller hub 90 may include a memory controller, an input/output (I/O) controller, and an interrupt controller, among others. In another example, controller hub 90 may comprise a northbridge connecting processor 82 to memory 84, and/or a southbridge connecting processor 82 to devices 86, 88, 92, and 94.

The exemplary systems and methods described above allow selectively controlling how a heterogeneous multitude of client devices (personal computers, smartphones, IoT devices like TVs, thermostats, door locks, refrigerators, wearables, etc.) access the Internet. Such control is critical to applications such as computer security (protecting users and devices from malicious content and/or Internet fraud), parental control (monitoring and/or restricting access of certain devices/users to certain online content), and application control (monitoring and/or restricting the use of selected software such as social media, streaming, gaming, gambling, and instant messaging applications), among others. Selectivity herein refers to the ability to apply device-specific and/or user-specific access policies.

Some embodiments enforce selective Internet access by manipulating a domain name service (DNS) mechanism. For clarity and simplicity, the disclosure above used the term 'domain name service' to denote a conventional DNS as currently used in Internet communications. In particular, encrypted DNS was illustrated using the DNS-over-TLS and DNS-over-HTTPS protocol families. However, a skilled artisan will understand that the methods and systems described herein may be easily adapted to any other service, version, and protocol for translating a domain name to a network address or vice versa.

Various manners of using DNS to control Internet access are known in the art. One such example modifies each DNS query by inserting a tag which may serve as a device identifier. The modified DNS query is then transmitted to a DNS server which enforces an access policy according to the respective tag. In a parental control example, in response to receiving a DNS query tagged with a client identifier, the DNS server may selectively choose to return an IP address or not, according to the identity of the client and/or to the requested domain name. However, in an encrypted domain name system, modifying a DNS query requires decrypting it, which in turn requires obtaining and maintaining an additional public key certificate specific to the device operating the modification. Certificate maintenance may be expensive and laborious, and may create specific computer security vulnerabilities.

In contrast to such conventional solutions, some embodiments of the present invention use a DNS proxy to intercept an encrypted communication session between a client device and a DNS server and without decrypting any communications, calculate a session identifier collectively identifying a set of DNS queries transmitted during the respective session. An exemplary session identifier according to some embodiments of the present invention may be calculated according to a ClientRandom value transmitted by the client device as part of a handshake exchange with the DNS server. The DNS proxy may then simply forward a DNS query to the DNS server which may decrypt and resolve it, and send back a DNS reply comprising a network address of an Internet resource that the respective client device is requesting access to.

The session identifier determined by the DNS proxy may be transmitted to a security server and/or DNS server via a side channel, together with a client identifier identifying the device and/or user that initiated the respective DNS session. The term 'side channel' is used herein to intuitively describe a communication channel distinct from the encrypted communication session connecting the client to the DNS server. In some embodiments, the DNS server and security server may then collaborate to enforce an access policy by selectively denying or allowing access to certain Internet resources according to an identity of the requesting device and/or user. In one example, the security server receives a decrypted domain name from the DNS server, determines according to a device-specific and/or user-specific access policy whether the respective device or user should be allowed access to the requested domain, and instructs the DNS server accordingly. To deny access, the DNS server may return an error or a dummy IP address to a DNS query from the respective client. In an alternative exemplary embodiment, the security server obtains from the DNS server an IP address resulting from resolving a domain name received in an encrypted DNS query from a client. The security server may then transmit the respective address to a traffic filter which may enforce an access policy by blocking an attempt by the respective client to access the respective IP address.

By avoiding having to decrypt an intercepted DNS query (and thus the need for a dedicated public key certificate), some embodiments allow installing the DNS proxy and/or traffic filter on an intermediary between the client device and the DNS server, such as a gateway device or router assigning network addresses to client devices on a home network (see e.g., network appliance 14 as shown in FIG. 1). Such a position has substantial advantages, for instance that it removes the need to install additional software on end clients, which are protected simply by joining the local network and defining an access policy.

Another advantage of executing DNS proxy 50 on a gateway device is that the actions carried out on by DNS proxy 50 are virtually undetectable by software executing on client devices. Crucially, malware potentially executing on client devices may not interfere with or subvert the activity of the DNS proxy. Another advantage is that a typical gateway device is already performing some form of computer security activities, such as enforcing a firewall or collecting traffic metadata for instance, and DNS filtering as disclosed herein may enhance and/or benefit from the existing capabilities.

Yet another important advantage of configurations wherein DNS proxy 50 executes on a gateway device is insight into local network topology. In the exemplary network configuration illustrated in FIG. 1, DNS server 20 typically cannot distinguish between DNS queries coming from client devices 12a and 12b (since both queries will typically originate at the same IP address), but appliance 14 can. Therefore, placing DNS proxy 50 on a gateway device may allow it to identify the source of incoming DNS queries and therefore efficiently associate queries with client devices and/or users.

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one hardware processor configured to:
   receive from a DNS proxy a query tracer characterizing an encrypted communication session between a client device and a DNS server, wherein:
      the DNS proxy is connected to the client device over a local network,
      the encrypted communication session comprises a cleartext part and an encrypted part, wherein the encrypted part comprises the client device transmitting an encrypted DNS query to the DNS server,
      the query tracer associates a session identifier with a client identifier, wherein the client identifier identifies the client device, and wherein the session identifier identifies the encrypted communication session and is determined according to a content of the cleartext part;
   receive from the DNS server a query notification comprising a domain name included in the encrypted DNS query, the query notification further associating the domain name with the session identifier;
   determine an access indicator according to the query tracer and query notification, the access indicator indicating whether an access policy selected according to the client identifier allows the client device to access an Internet domain having the domain name; and
   communicate the access indicator for enforcing the access policy.

2. The computer system of claim 1, wherein the cleartext part comprises a handshake including a ClientHello message sent by the client device to the DNS server and a ServerHello message sent by the DNS server to the client device, and wherein the session identifier is determined according to a content of the ClientHello message or according to a content of the ServerHello message.

3. The computer system of claim 2, wherein the session identifier is determined according to a ClientRandom value sent by the client device to the DNS server during the handshake.

4. The computer system of claim 1, wherein the at least one hardware processor is configured to communicate the access indicator to the DNS server.

5. The computer system of claim 1, wherein the at least one hardware processor is configured to communicate the access indicator to a traffic filter configured to:
   intercept an attempt by the client device to access the Internet domain; and in response, when the access indicator indicates that the client device is not allowed to access the Internet domain, prevent the client device from accessing the Internet domain.

6. The computer system of claim 1, wherein the query tracer includes the session identifier and the client identifier.

7. The computer system of claim 1, wherein the query notification includes the domain name and the session identifier.

8. The computer system of claim 7, wherein the query notification further includes a query identifier identifying the encrypted DNS query and an IP address produced by resolving the encrypted DNS query.

9. A method comprising employing at least one hardware processor of a computer system to:
   receive from a DNS proxy a query tracer characterizing an encrypted communication session between a client device and a DNS server, wherein:
      the DNS proxy is connected to the client device over a local network,
      the encrypted communication session comprises a cleartext part and an encrypted part, wherein the encrypted part comprises the client device transmitting an encrypted DNS query to the DNS server,
      the query tracer associates a session identifier with a client identifier, wherein the client identifier identifies the client device, and wherein the session identifier identifies the encrypted communication session and is determined according to a content of the cleartext part;
   receive from the DNS server a query notification comprising a domain name included in the encrypted DNS query, the query notification further associating the domain name with the session identifier;
   determine an access indicator according to the query tracer and query notification, the access indicator indicating whether an access policy selected according to the client identifier allows the client device to access an Internet domain having the domain name; and
   communicate the access indicator for enforcing the access policy.

10. The method of claim 9, wherein the cleartext part comprises a handshake including a ClientHello message sent by the client device to the DNS server and a ServerHello message sent by the DNS server to the client device, and wherein the session identifier is determined according to a content of the ClientHello message or according to a content of the ServerHello message.

11. The method of claim 10, wherein the session identifier is determined according to a ClientRandom value sent by the client device to the DNS server during the handshake.

12. The method of claim 9, wherein the at least one hardware processor is configured to communicate the access indicator to the DNS server.

13. The method of claim 9, wherein the at least one hardware processor is configured to communicate the access indicator to a traffic filter configured to:
   intercept an attempt by the client device to access the Internet domain; and
   in response, when the access indicator indicates that the client device is not allowed to access the Internet domain, prevent the client device from accessing the Internet domain.

14. The method of claim 9, wherein the query tracer includes the session identifier and the client identifier.

15. The method of claim 9, wherein the query notification includes the domain name and the session identifier.

16. The method of claim 15, wherein the query notification further includes a query identifier identifying the encrypted DNS query and an IP address produced by resolving the encrypted DNS query.

17. A non-transitory computer-readable medium storing instructions which, when executed by at least one hardware processor of a computer system, cause the computer system to:
   receive from a DNS proxy a query tracer characterizing an encrypted communication session between a client device and a DNS server, wherein:
      the DNS proxy is connected to the client device over a local network,
      the encrypted communication session comprises a cleartext part and an encrypted part, wherein the encrypted part comprises the client device transmitting an encrypted DNS query to the DNS server,
      the query tracer associates a session identifier with a client identifier, wherein the client identifier identifies the client device, and wherein the session identifier identifies the encrypted communication session and is determined according to a content of the cleartext part;
   receive from the DNS server a query notification comprising a domain name included in the encrypted DNS query, the query notification further associating the domain name with the session identifier;
   determine an access indicator according to the query tracer and query notification, the access indicator indicating whether an access policy selected according to the client identifier allows the client device to access an Internet domain having the domain name; and
   communicate the access indicator for enforcing the access policy.

* * * * *